US009965458B2

(12) United States Patent
Munro et al.

(10) Patent No.: US 9,965,458 B2
(45) Date of Patent: May 8, 2018

(54) INTELLIGENT SYSTEM THAT DYNAMICALLY IMPROVES ITS KNOWLEDGE AND CODE-BASE FOR NATURAL LANGUAGE UNDERSTANDING

(71) Applicant: Idibon, Inc., San Francisco, CA (US)

(72) Inventors: Robert J. Munro, San Francisco, CA (US); Rob Voigt, Palo Alto, CA (US); Schuyler D. Erle, San Francisco, CA (US); Brendan D. Callahan, Philadelphia, PA (US); Gary C. King, Los Altos, CA (US); Jessica D. Long, San Francisco, CA (US); Jason Brenier, Oakland, CA (US); Tripti Saxena, Cupertino, CA (US); Stefan Krawczyk, Menlo Park, CA (US)

(73) Assignee: Sansa AI Inc., San Francisco, CA (US)

(*) Notice: Subject to any disclaimer, the term of this patent is extended or adjusted under 35 U.S.C. 154(b) by 0 days. days.

(21) Appl. No.: 14/964,512

(22) Filed: Dec. 9, 2015

(65) Prior Publication Data
US 2016/0162466 A1 Jun. 9, 2016

Related U.S. Application Data

(60) Provisional application No. 62/089,736, filed on Dec. 9, 2014, provisional application No. 62/089,742, filed
(Continued)

(51) Int. Cl.
G06F 17/20 (2006.01)
G06F 17/21 (2006.01)
(Continued)

(52) U.S. Cl.
CPC ........ *G06F 17/277* (2013.01); *G06F 17/2715* (2013.01); *G06F 17/2785* (2013.01)

(58) Field of Classification Search
CPC ...... G06F 17/28; G06F 17/2785; G06F 17/21; G06F 17/2765; G06F 17/27;
(Continued)

(56) References Cited

U.S. PATENT DOCUMENTS 5,721,939 A * 2/1998 Kaplan ................. G06F 17/277 704/1
5,890,103 A * 3/1999 Carus .................... G06F 17/274 704/8
(Continued)

Primary Examiner — Edgar Guerra-Erazo
(74) Attorney, Agent, or Firm — K&L Gates LLP; Jordan A. Kwan

(57) ABSTRACT

Systems, methods, and apparatuses are presented for a novel natural language tokenizer and tagger. In some embodiments, a method for tokenizing text for natural language processing comprises: generating from a pool of documents, a set of statistical models comprising one or more entries each indicating a likelihood of appearance of a character/letter sequence in the pool of documents; receiving a set of rules comprising rules that identify character/letter sequences as valid tokens; transforming one or more entries in the statistical models into new rules that are added to the set of rules when the entries indicate a high likelihood; receiving a document to be processed; dividing the document to be processed into tokens based on the set of statistical models and the set of rules, wherein the statistical models are applied where the rules fail to unambiguously tokenize the document; and outputting the divided tokens for natural language processing.

20 Claims, 11 Drawing Sheets

Related U.S. Application Data on Dec. 9, 2014, provisional application No. 62/089,745, filed on Dec. 9, 2014, provisional application No. 62/089,747, filed on Dec. 9, 2014, provisional application No. 62/254,090, filed on Nov. 11, 2015, provisional application No. 62/254,095, filed on Nov. 11, 2015.

(51) Int. Cl.
*G06F 17/27* (2006.01)
*G06F 17/28* (2006.01)

(58) Field of Classification Search
CPC ............ G06F 17/2809; G06F 17/2735; G06F 17/2881; G06F 17/2705; G10L 15/1815
USPC ....................................................... 704/1–10
See application file for complete search history.

(56) References Cited

U.S. PATENT DOCUMENTS

| | | | | |
|---|---|---|---|---|
| 6,182,029 | B1* | 1/2001 | Friedman | G06F 17/2705 704/9 |
| 6,212,494 | B1* | 4/2001 | Boguraev | G06F 17/2775 704/10 |
| 9,069,755 | B2* | 6/2015 | Moore | G06F 17/2715 |
| 2011/0099133 | A1* | 4/2011 | Chang | G06N 99/005 706/12 |
| 2011/0112995 | A1* | 5/2011 | Chang | G06N 99/005 706/12 |
| 2011/0224983 | A1* | 9/2011 | Moore | G06F 17/2715 704/240 |

\* cited by examiner

```
1000

1005          1010             1015
{             {                {
 "offset": 0,  "offset": 16,    "offset": 39,
 "length": 1,  "length": 5,     "length": 1,
 "value": "word", "value": "word", "value": "space",
 "text": "I"   "text": "about"  "text": " "
},            },               },
{             {                {
 "offset": 1,  "offset": 21,    "offset": 40,
 "length": 1,  "length": 1,     "length": 9,
 "value": "space", "value": "space", "value": "word",
 "text": " "   "text": " "      "text": "president"
},            },               },
{             {                {
 "offset": 2,  "offset": 22,    "offset": 49,
 "length": 2,  "length": 6,     "length": 1,
 "value": "word", "value": "word", "value": "space",
 "text": "am"  "text": "Barack" "text": " "
},            },               },
{             {                {
 "offset": 4,  "offset": 28,    "offset": 50,
 "length": 1,  "length": 1,     "length": 2,
 "value": "space", "value": "space", "value": "word",
 "text": " "   "text": " "      "text": "of"
},            },               },
{             {                {
 "offset": 5,  "offset": 29,    "offset": 52,
 "length": 1,  "length": 5,     "length": 1,
 "value": "word", "value": "word", "value": "space",
 "text": "a"   "text": "Obama"  "text": " "
},            },               },
{             {                {
 "offset": 6,  "offset": 34,    "offset": 53,
 "length": 1,  "length": 1,     "length": 3,
 "value": "space", "value": "punct", "value": "word",
 "text": " "   "text": ","      "text": "the"
},            },               },
{             {                {
 "offset": 7,  "offset": 35,    "offset": 56,
 "length": 8,  "length": 1,     "length": 1,
 "value": "word", "value": "space", "value": "space",
 "text": "document" "text": " " "text": " "
},            },               },
{             {
 "offset": 15, "offset": 36,
 "length": 1,  "length": 3,
 "value": "space", "value": "word",
 "text": " "   "text": "the"
},            },
```

FIG. 10

INTELLIGENT SYSTEM THAT DYNAMICALLY IMPROVES ITS KNOWLEDGE AND CODE-BASE FOR NATURAL LANGUAGE UNDERSTANDING

CROSS REFERENCES TO RELATED APPLICATIONS

This application claims the benefits of U.S. Provisional Application 62/089,736, filed Dec. 9, 2014, and titled, "METHODS AND SYSTEMS FOR ANNOTATING NATURAL LANGUAGE PROCESSING," U.S. Provisional Application 62/089,742, filed Dec. 9, 2014, and titled, "METHODS AND SYSTEMS FOR IMPROVING MACHINE PERFORMANCE IN NATURAL LANGUAGE PROCESSING," U.S. Provisional Application 62/089,745, filed Dec. 9, 2014, and titled, "METHODS AND SYSTEMS FOR IMPROVING FUNCTIONALITY IN NATURAL LANGUAGE PROCESSING," U.S. Provisional Application 62/089,747, filed Dec. 9, 2014, and titled, "METHODS AND SYSTEMS FOR SUPPORTING NATURAL LANGUAGE PROCESSING," U.S. Provisional Application 62/254,090, filed Nov. 11, 2015, and titled "TOKENIZER AND TAGGER FOR LANGUAGE AGNOSTIC METHODS FOR NATURAL LANGUAGE PROCESSING," and U.S. Provisional Application 62/254,095, filed Nov. 11, 2015, and titled "METHODS FOR MACHINE LEARNING IN NATURAL LANGUAGE MODELS USING FEATURE EXTRACTION," the disclosures of which are incorporated herein in their entireties and for all purposes.

This application is also related to, U.S. patent application Ser. No. 14/964,517, filed Dec. 9, 2015, and titled "METHODS FOR GENERATING NATURAL LANGUAGE PROCESSING SYSTEMS," U.S. patent application Ser. No. 14/964,518, filed Dec. 9, 2015, and titled "ARCHITECTURES FOR NATURAL LANGUAGE PROCESSING," U.S. patent application Ser. No. 14/964,520, filed Dec. 9, 2015, and titled "OPTIMIZATION TECHNIQUES FOR ARTIFICIAL INTELLIGENCE," U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE," U.S. patent application Ser. No. 14/964,510, filed Dec. 9, 2015, and titled "METHODS AND SYSTEMS FOR IMPROVING MACHINE LEARNING PERFORMANCE," U.S. patent application Ser. No. 14/964,511, filed Dec. 9, 2015, and titled "METHODS AND SYSTEMS FOR MODELING COMPLEX TAXONOMIES WITH NATURAL LANGUAGE UNDERSTANDING," U.S. patent application Ser. No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION," U.S. patent application Ser. No. 14/964,526, filed Dec. 9, 2015, and titled "METHODS AND SYSTEMS FOR PROVIDING UNIVERSAL PORTABILITY IN MACHINE LEARNING," and U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING," each of which are filed concurrently herewith, and the entire contents and substance of all of which are hereby incorporated in total by reference in their entireties and for all purposes.

TECHNICAL FIELD

The subject matter disclosed herein generally relates to processing data. In some example embodiments, the present disclosures relate to a tokenizer and tagger for language agnostic methods for natural language processing.

BACKGROUND

There is a need for assisting customers or users to accurately and expediently process human communications brought upon by the capabilities of the digital age. The modes of human communications brought upon by digital technologies have created a deluge of information that can be difficult for human readers to handle alone. Companies and research groups may want to determine trends in the human communications to determine what people generally care about for any particular topic, whether it be what car features are being most expressed on Twitter®, what political topics are being most expressed on Facebook®, what people are saying about the customer's latest product in their customer feedback page, and so forth. It may be desirable for companies to aggregate and then synthesize the thousands or even millions of human communications from the many different modes available in the digital age (e.g., Twitter®, blogs, email, etc.). Processing all this information by humans alone can be overwhelming and cost-inefficient. Methods today may therefore rely on computers to apply natural language processing in order to interpret the many human communications available in order to analyze, group, and ultimately categorize the many human communications into digestible patterns of communication.

BRIEF SUMMARY

A method for tokenizing text for natural language processing comprises: generating, by one or more processors in a natural language processing platform, and from a pool of documents, a set of statistical models comprising one or more entries each indicating a likelihood of appearance of a character/letter sequence in the pool of documents; receiving, by the one or more processors, a set of rules comprising rules that identify character/letter sequences as valid tokens; transforming, by the one or more processors, one or more entries in the statistical models into new rules that are added to the set of rules when the entries indicate a high likelihood; receiving, by the one or more processors, a document to be processed; dividing, by the one or more processors, the document to be processed into tokens based on the set of statistical models and the set of rules, wherein the statistical models are applied where the rules fail to unambiguously tokenize the document; and outputting, by the one or more processors, the divided tokens for natural language processing.

In some embodiments, the set of statistical models further comprises statistical models based on human annotation, and the method further comprises: generating, by the one or more processors, one or more human readable prompts configured to elicit annotations of one or more documents in the pool of documents, wherein the annotations comprise identification of one or more character/letter sequences in the documents as valid tokens; receiving, by the one or more processors, one or more annotations elicited by the human readable prompts; and generating, by the one or more processors, statistical models based on the received annotations, wherein the statistical models comprise one or more entries each indicating a likelihood of appearance of a character/letter sequence in the character/letter sequences annotated as valid tokens.

In some embodiments, the document to be processed is in one or more languages; and the divided tokens are outputted in a language agnostic format.

In some embodiments, the document to be processed is in more than one language; the set of rules further comprises a rule that divides portions of the document in different languages into different segments; and the segments of the document in different languages are divided into tokens based on a different combination of rules and statistical models.

In some embodiments, the set of rules further comprises a rule that triggers the application of rules and/or statistical models for further tokenization.

In some embodiments, at least one of the divided tokens contains a morpheme. In some embodiments, at least one of the divided tokens contains a group of words. In some embodiments, at least one of the divided tokens contains a turn in a conversation.

In some embodiments, dividing the document to be processed into tokens based on the set of statistical models comprises comparing statistical likelihood of more than one candidate set of tokens. In some embodiments, the candidate set of tokens that contains tokens with smallest sizes is preferred.

In some embodiments, more than one candidate set of tokens is outputted for natural language processing.

In some embodiments, the set of statistical models further comprises statistical models for normalizing variants of a token into a single token and/or the set of rules further comprises rules for normalizing variants of a token into a single token; and the method further comprises normalizing variants of a token into a single token based on the statistical models and/or the rules.

In some embodiments, the set of statistical models further comprises statistical models for adding tags to the tokens and/or the set of rules further comprises rules for adding tags to the tokens; and the method further comprises adding tags to the tokens based on the statistical models and/or the rules.

In some embodiments, the tags are based on semantic information and/or structural information.

In some embodiments, the set of rules further comprises one or more rules that identify markup language content, an Internet address, a hashtag, or an emoji/emoticon.

In some embodiments, the set of statistical models and/or the set of rules are adjusted based at least in part on an author of the document.

In some embodiments, the set of statistical models and/or the set of rules are based at least in part on intra-document information.

An apparatus for tokenizing text for natural language processing comprises one or more processors configured to: generate from a pool of documents a set of statistical models comprising one or more entries each indicating a likelihood of appearance of a character/letter sequence in the pool of documents; receive a set of rules comprising rules that identify character/letter sequences as valid tokens; transform one or more entries in the statistical models into new rules that are added to the set of rules when the entries indicate a high likelihood; receive a document to be processed; divide the document to be processed into tokens based on the set of statistical models and the set of rules, wherein the statistical models are applied where the rules fail to unambiguously tokenize the document; and output the divided tokens for natural language processing.

In some embodiments, the set of statistical models further comprises statistical models based on human annotation, and the one or more processors are further configured to: generate one or more human readable prompts configured to elicit annotations of one or more documents in the pool of documents, wherein the annotations comprise identification of one or more character/letter sequences in the documents as valid tokens; receive one or more annotations elicited by the human readable prompts; and generate statistical models based on the received annotations, wherein the statistical models comprise one or more entries each indicating a likelihood of appearance of a character/letter sequence in the character/letter sequences annotated as valid tokens.

A non-transitory computer readable medium comprises instructions that, when executed by a processor, cause the processor to: generate from a pool of documents a set of statistical models comprising one or more entries each indicating a likelihood of appearance of a character/letter sequence in the pool of documents; receive a set of rules comprising rules that identify character/letter sequences as valid tokens; transform one or more entries in the statistical models into new rules that are added to the set of rules when the entries indicate a high likelihood; receive a document to be processed; divide the document to be processed into tokens based on the set of statistical models and the set of rules, wherein the statistical models are applied where the rules fail to unambiguously tokenize the document; and output the divided tokens for natural language processing.

BRIEF DESCRIPTION OF THE DRAWINGS

Some embodiments are illustrated by way of example and not limitation in the figures of the accompanying drawings.

FIG. 10 shows a more detailed example of a format for tokenizing a sentence into an annotated set, according to some embodiments.

DETAILED DESCRIPTION

Figure 1:
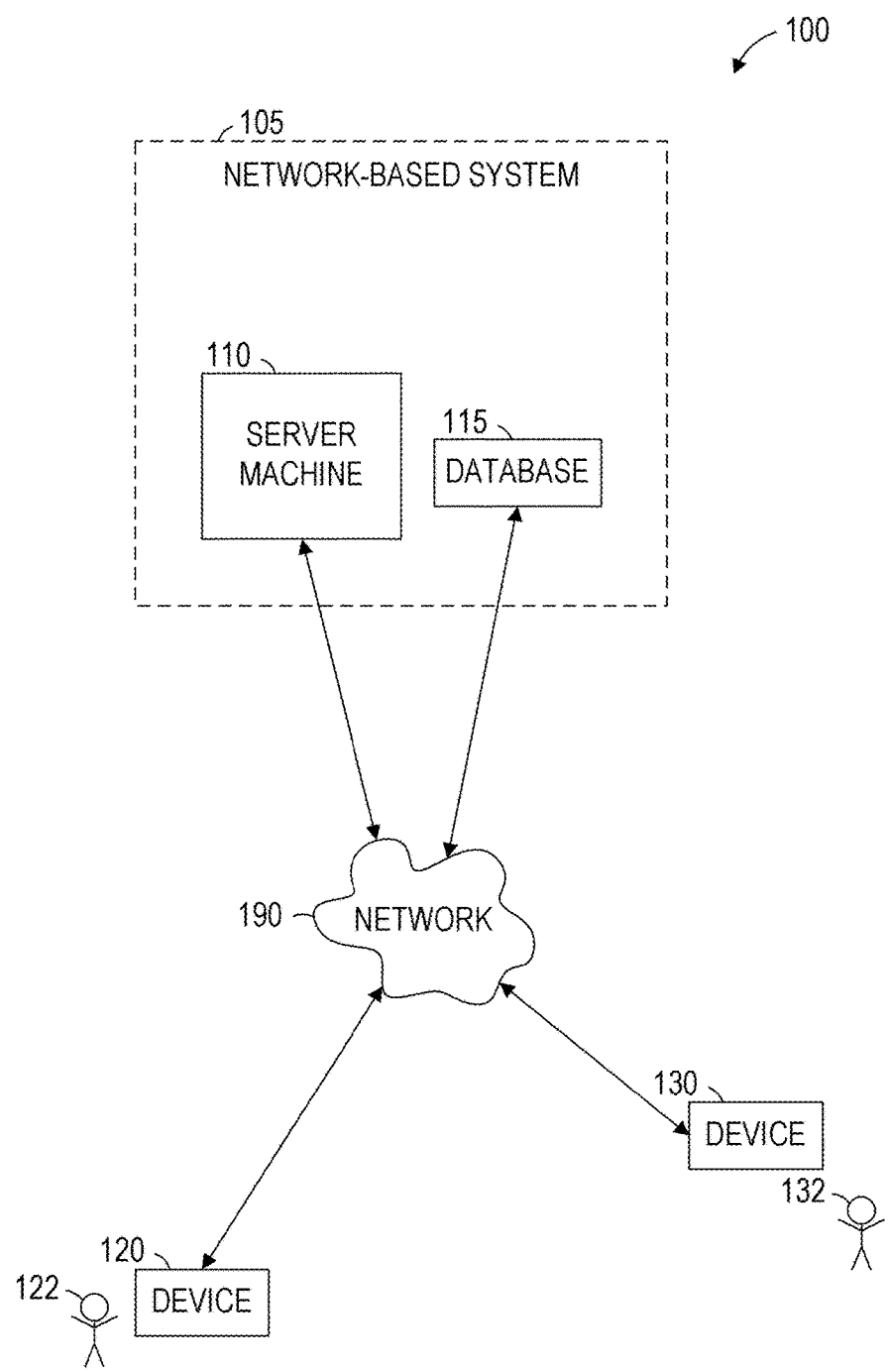
FIG. 1 is a network diagram illustrating an example network environment suitable for aspects of the present disclosure, according to some example embodiments.

Example methods, apparatuses, and systems (e.g., machines) are presented for a tokenizer configured to process documents written in one or more languages into a plurality of tokens that may allow for easy and efficient natural language processing. To perform natural language processing on text of a document, conventionally a computer requires that the text be partitioned into a number of smaller pieces of text, typically referred to as tokens. The amount of content in a token may vary, dependent on the algorithmic structure of the natural language processor. For example, a token may consist of a single word, a single punctuation mark, a single letter or character, a space, or a subset of characters in a single word. A token may also consist of a set of words or even a set of sentences. After a tokenizer has subdivided the text of the document into a plurality of tokens, additional processing may utilize the tokens for natural language processing by attempting to combine one or more of the tokens together into meaningful words or phrases (referred to as "features"). Thus, tokens are often considered the smallest unit of text or content, sometimes viewed as building blocks, to allow a natural language processor to begin to understand the meaning of the text of the document.

Aspects of the present disclosure are presented for a natural language tokenizer and tagger that includes novel features over conventional tokenizers in the art. In some embodiments, the tokenizer and tagger of the present disclosure may divide text into tokens based on a combination of rules and statistical models. Rules are efficient in tokenizing the document, but often fail to capture all the ambiguities in human communications. Statistical models help to resolve these ambiguities. In some embodiments, once the tokenizer and tagger gains enough confidence in the statistical models, it may convert the statistical models to rules, thus improving the efficiency of tokenization. In some embodiments, the statistical models may be generated based at least in part on human annotations, thus improving the accuracy of the statistical models.

In other words, the tokenizer and tagger may be implemented as software, or may be implemented as machine learning that applies its knowledge from stored data that is implemented as machine intelligence. The tokenizer and tagger may use a combination of software and machine learning. For example, the tokenizer might be implemented so that the code specifies that white spaces separate words, but it might also use statistical machine learning to separate words without spaces, as is common with the Chinese and other CJK (Chinese, Japanese and Korean) languages. For another example, the code might specify that a tag with the value "noun" applies to a word, or it might consult a machine learning process that uses statistical methods to predict that the tag "noun" applies.

In some embodiments, the tokenizer and tagger might use feedback from downstream processing, such as when a user declares a word boundary as part of a span-tagging task. The feedback is used to improve the tokenizer performance. The feedback may be incorporated in one-off feedback or in continuous feedback systems such as deep-learning systems that optimize both the tokenizer/tagger and the downstream process simultaneously.

In some embodiments, the tokenizer of the present disclosure processes documents written in multiple languages. The tokenizer may be configured to process a document written in any language, without being told what language or languages the document is written in. In some embodiments, the tokenizer processes these documents at the word level, meaning the tokenizer does not subdivide the words in the text into each individual letter or character, unless of course the word is a single letter or character. Processing the text at the word level allows for more efficient storage and more efficient processing, since the utility of single letters would require the letters to be recombined into words anyway for natural language processing. The tokenizer may also be configured to tokenize punctuations and spaces, particularly when a document is written in multiple languages.

In some embodiments, the tokenized output is expressed in a common format, no matter what language or languages the documents are written in. Because all of the documents may be expressed in a common format after being processed by the tokenizer and tagger, additional programs in a server or processor for natural language processing may be designed to adapt to just the single common format, rather than be designed to have to cater to multiple languages, each having different forms of syntax and grammar, etc. In this way, the tokenizer and tagger of the present disclosure enables all later programs utilizing the tokenized text to be "language agnostic," meaning the programs need not concern themselves with what language or languages the documents are written in. This design architecture also allows for high language scalability, in that the natural language processing system may be easily adapted to process a new language by modifying the tokenizer and tagger for the new language, rather than needing to modify dozens of additional programs that utilize the tokens to handle the new language.

In some embodiments, the tokenizer and tagger is also configured to handle written languages that are based on characters, such as Chinese, Japanese, and Korean (referred to herein as CJK languages). Various statistical methods may be incorporated into the tokenizer and tagger to determine when to transition to the next token for CJK characters. In some embodiments, the tokenizer and tagger expertly handles Korean text, which is structured like a character language but also forms the characters based on a combination of a consonant character and a vowel character, rendering the Korean language rather unique among languages for tokenization.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Referring to FIG. 1, a network diagram illustrating an example network environment 100 suitable for performing aspects of the present disclosure is shown, according to some example embodiments. The example network environment 100 includes a server machine 110, a database 115, a first device 120 for a first user 122, and a second device 130 for a second user 132, all communicatively coupled to each other via a network 190. The server machine 110 may form all or part of a network-based system 105 (e.g., a cloud-based server system configured to provide one or more services to the first and second devices 120 and 130). The server machine 110, the first device 120, and the second device 130 may each be implemented in a computer system, in whole or in part, as described below with respect to FIG. 11. The network-based system 105 may be an example of a natural language platform configured to generate natural language models as described herein. The server machine 110 and the database 115 may be components of the natural language platform configured to perform these functions. While the server machine 110 is represented as just a single machine and the database 115 where is represented as just a single database, in some embodiments, multiple server machines and multiple databases communicatively coupled in parallel or in serial may be utilized, and embodiments are not so limited.

Also shown in FIG. 1 are a first user 122 and a second user 132. One or both of the first and second users 122 and 132 may be a human user, a machine user (e.g., a computer configured by a software program to interact with the first device 120), or any suitable combination thereof (e.g., a human assisted by a machine or a machine supervised by a human). The first user 122 may be associated with the first device 120 and may be a user of the first device 120. For example, the first device 120 may be a desktop computer, a vehicle computer, a tablet computer, a navigational device, a portable media device, a smartphone, or a wearable device (e.g., a smart watch or smart glasses) belonging to the first user 122. Likewise, the second user 132 may be associated with the second device 130. As an example, the second device 130 may be a desktop computer, a vehicle computer, a tablet computer, a navigational device, a portable media device, a smartphone, or a wearable device (e.g., a smart watch or smart glasses) belonging to the second user 132. The first user 122 and a second user 132 may be examples of users or customers interfacing with the network-based system 105 to utilize a natural language model according to their specific needs. In other cases, the users 122 and 132 may be examples of annotators who are supplying annotations to documents to be used for training purposes when developing a natural language model. In other cases, the users 122 and 132 may be examples of analysts who are providing inputs to the natural language platform to more efficiently train the natural language model. The users 122 and 132 may interface with the network-based system 105 through the devices 120 and 130, respectively.

Any of the machines, databases 115, or first or second devices 120 or 130 shown in FIG. 1 may be implemented in a general-purpose computer modified (e.g., configured or programmed) by software (e.g., one or more software modules) to be a special-purpose computer to perform one or more of the functions described herein for that machine, database 115, or first or second device 120 or 130. For example, a computer system able to implement any one or more of the methodologies described herein is discussed below with respect to FIG. 11. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
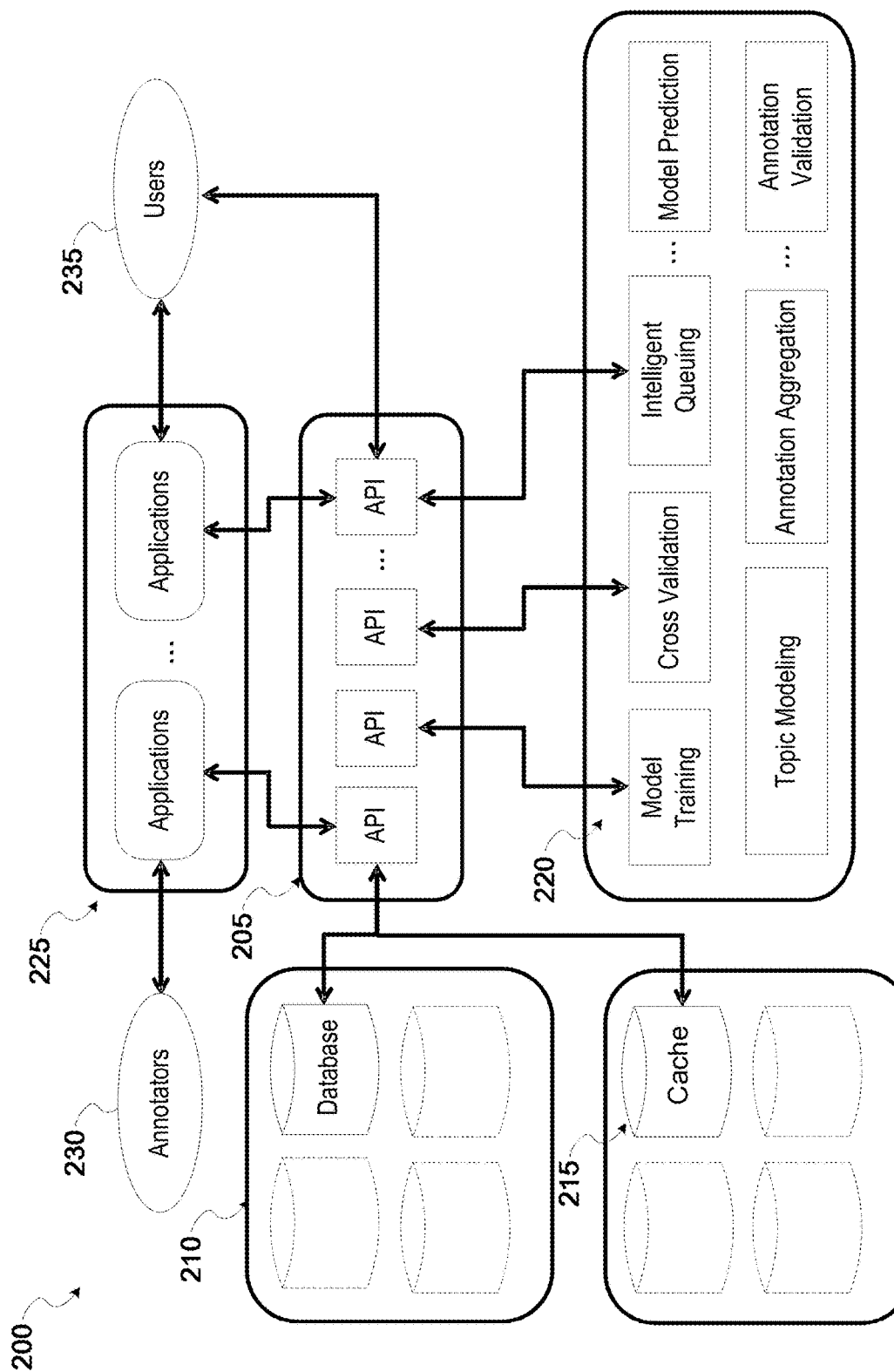
FIG. 2 is a block diagram showing an example system architecture for performing aspects of the present disclosure, according to some example embodiments

Referring to FIG. 2, a diagram 200 is presented showing an example system architecture for performing aspects of the present disclosure, according to some example embodiments. The example system architecture according to diagram 200 represents various data structures and their interrelationships that may comprise a natural language platform, such as the natural language platform 170, or the network-based system 105. These various data structures may be implemented through a combination of hardware and software, the details of which may be apparent to those with skill in the art based on the descriptions of the various data structures described herein. For example, an API module 205 includes one or more API processors, where multiple API processors may be connected in parallel. In some example embodiments, the repeating boxes in the diagram 200 represent identical servers or machines, to signify that the system architecture in diagram 200 may be scalable to an arbitrary degree. The API module 205 may represent a point of contact for multiple other modules, includes a database module 210, a cache module 215, background processes module 220, applications module 225, and even an interface for users 235 in some example embodiments. The API module 205 may be configured to receive or access data from database module 210. The data may include digital forms of thousands or millions of human communications. The cache module 215 may store in more accessible memory various information from the database module 210 or from users 235 or other subscribers. Because the database module 210 and cache module 215 show accessibility through API module 205, the API module 205 can also support authentication and authorization of the data in these modules. The background module 220 may be configured to perform a number of background processes for aiding natural language processing functionality. Various examples of the background processes include a model training module, a cross validation module, an intelligent queuing module, a model prediction module, a topic modeling module, an annotation aggregation module, an annotation validation module, and a feature extraction module. These various modules are described in more detail below as well as in U.S. patent application Ser. No. 14/964,520, filed Dec. 9, 2015, and titled "OPTIMIZATION TECHNIQUES FOR ARTIFICIAL INTELLIGENCE," U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE," U.S. patent application Ser. No. 14/964,510, filed Dec. 9, 2015, and titled "METHODS AND SYSTEMS FOR IMPROVING MACHINE LEARNING PERFORMANCE," U.S. patent application Ser. No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION," and U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING," each of which are again incorporated by reference in their entireties. The API module 205 may also be configured to support display and functionality of one or more applications in applications module 225.

In some embodiments, the API module 205 may be configured to provide as an output the natural language model packaged in a computationally- and memory-efficient manner. The natural language model may then be transmitted to multiple client devices, such as devices 120 and 130, including transmitting to mobile devices and other machines with less memory and less processing power.

Figure 3:
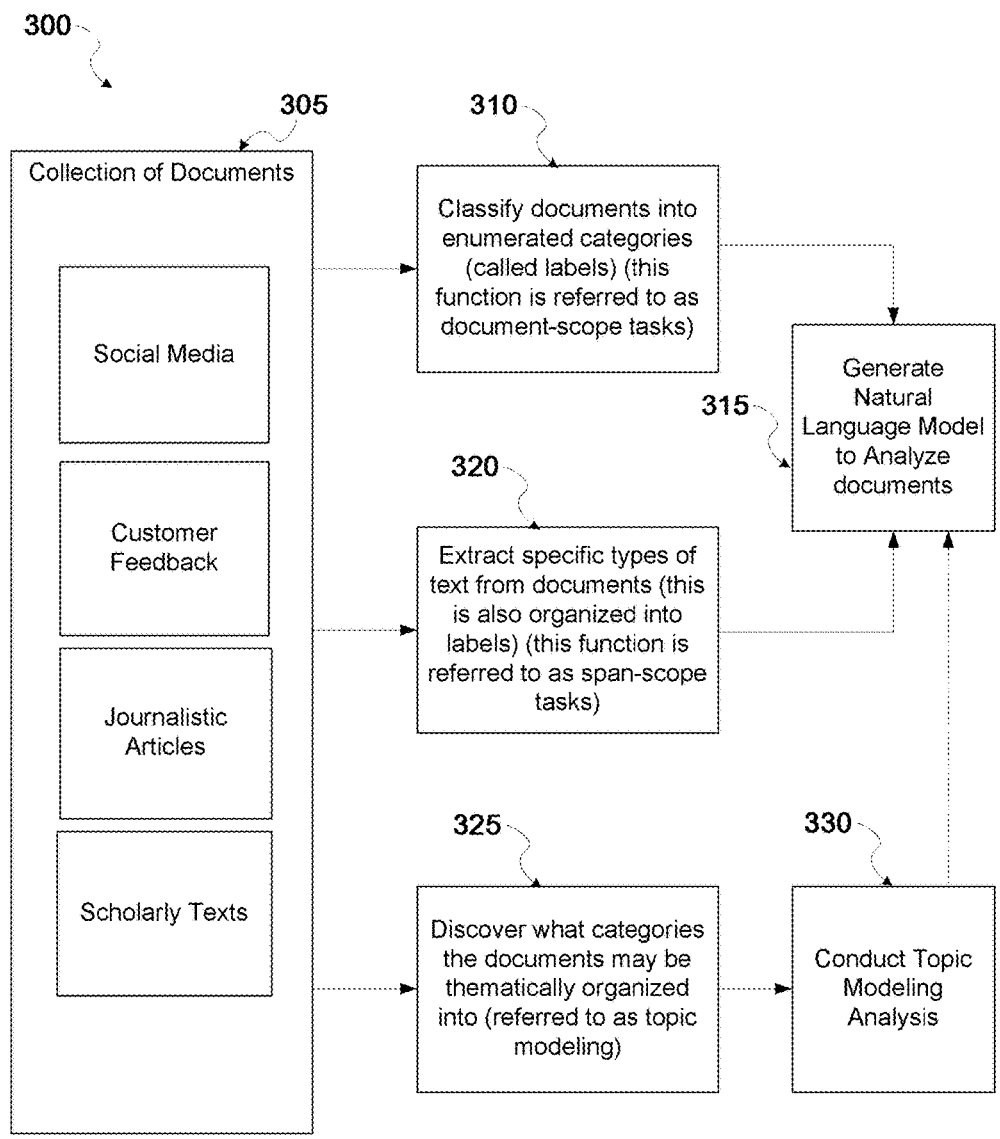
FIG. 3 is a high level diagram showing an example language modeling flow for how human communications are processed using a combination of machine learning techniques and human annotations, according to some example embodiments.

Referring to FIG. 3, a high level diagram 300 is presented showing various examples of types of human communications and what the objectives may be for a natural language model to accomplish. Here, various sources of data, sometimes referred to as a collection of documents 305, may be obtained and stored in, for example database 115, client data store 155, or database modules 210, and may represent different types of human communications, all capable of being analyzed by a natural language model. Examples of the types of documents 305 include, but are not limited to, posts in social media, emails or other writings for customer feedback, pieces of or whole journalistic articles, commands spoken or written to electronic devices, transcribed call center recordings; electronic (instant) messages; corporate communications (e.g., SEC 10-k, 10-q); confidential documents and communications stored on internal collaboration systems (e.g., SharePoint, Notes), and pieces of or whole scholarly texts.

In some embodiments, at block 310, it may be desired to classify any of the documents 305 into a number of enumerated categories or topics, consistent with some of the descriptions mentioned above. This may be referred to as performing a document-scope task. For example, a user 130 in telecommunications may supply thousands of customer service emails related to services provided by a telecommunications company. The user 130 may desire to have a natural language model generated that classifies the emails into predetermined categories, such as negative sentiment about their Internet service, positive sentiment about their Internet service, negative sentiment about their cable service, and positive sentiment about their cable service. As previously mentioned, these various categories for which a natural language model may classify the emails into, e.g. "negative" sentiment about "Internet service," "positive" sentiment about "Internet service," "negative" sentiment about "cable service," etc., may be referred to as "labels." Based on these objectives, at block 315, a natural language model may be generated that is tailored to classify these types of emails into these types of labels.

As another example, in some embodiments, at block 320, it may be desired to extract specific subsets of text from documents, consistent with some of the descriptions mentioned above. This may be another example of performing a span-scope task, in reference to the fact that this function focuses on a subset within each document (as previously mentioned, referred to herein as a "span"). For example, a user 130 may desire to identify all instances of a keyword, key phrase, or general subject matter within a novel. Certainly, this span scope task may be applied to multiple novels or other documents. Another example includes a company that may want to extract phrases that correspond to products or product features (e.g., "iPhone 5" or "battery life"). Here too, based on this objective, at block 315, a natural language model may be generated that is tailored to perform this function for a specified number of documents.

As another example, in some embodiments, at block 325, it may be desired to discover what categories the documents may be thematically or topically organized into in the first place, consistent with descriptions above about topic modeling. In some cases, the user 130 may utilize the natural language platform only to perform topic modeling and to discover what topics are most discussed in a specified collection of documents 305. To this end, the natural language platform may be configured to conduct topic modeling analysis at block 330. In some cases, it may be desired to then generate a natural language model that categorizes the documents 305 into these newfound topics. Thus, after performing the topic modeling analysis 230, in some embodiments, the natural language model may also be generated at block 315.

Figure 4:
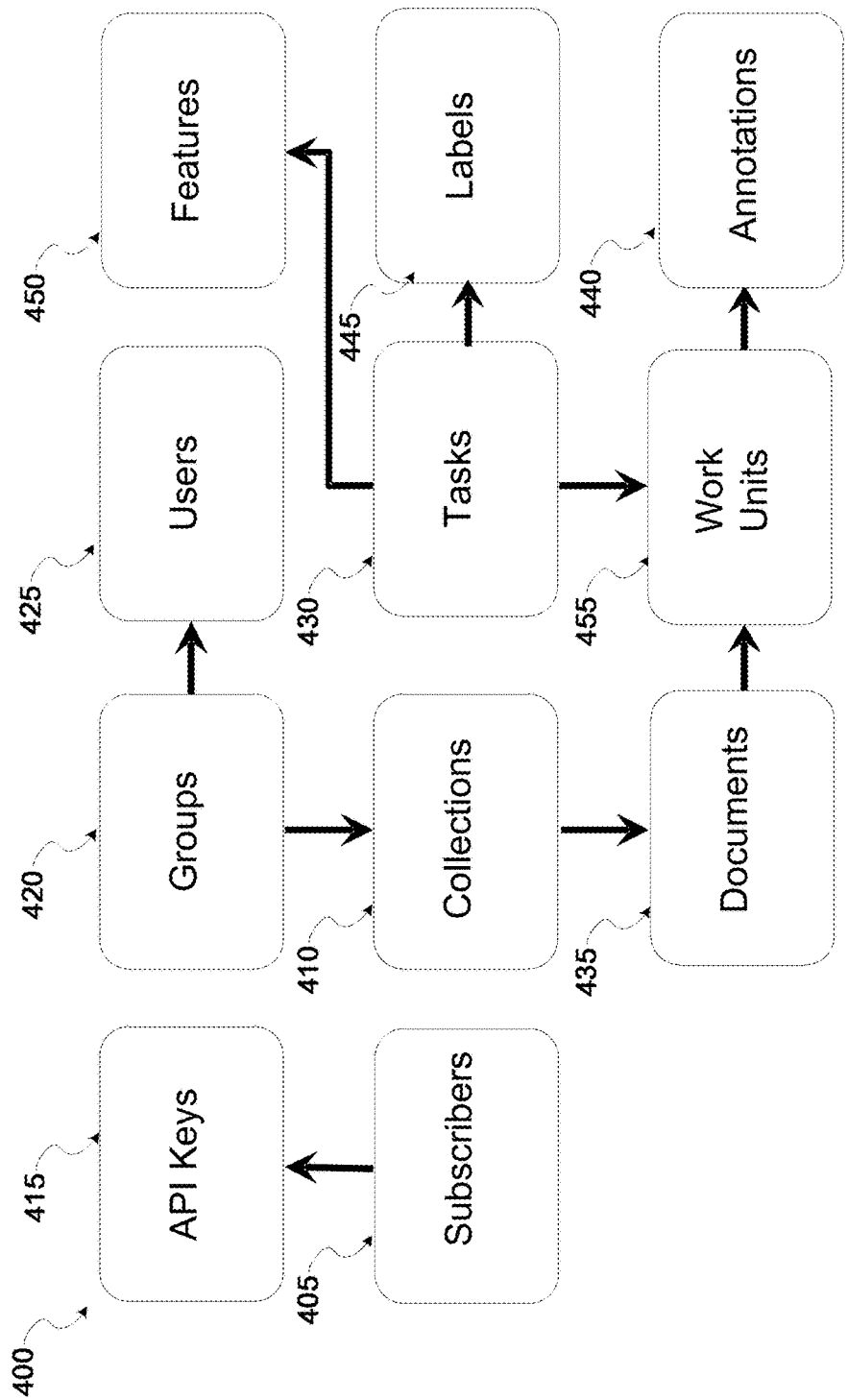
FIG. 4 is a diagram showing an example flowchart for how different data structures within the system architecture may be related to one another, according to some example embodiments.

Referring to FIG. 4, a diagram 400 is presented showing an example flowchart for how different data structures within the system architecture may be related to one another, according to some example embodiments. Here, the collections data structure 410 represents a set of documents 435 that in some cases may generally be homogenous. A document 435 represents a human communication expressed in a single discrete package, such as a single tweet, a webpage, a chapter of a book, a command to a device, or a journal article, or any part thereof. Each collection 410 may have one or more tasks 430 associated with it. A task 430 may be thought of as a classification scheme. For example, a collection 410 of tweets may be classified by its sentiment, e.g. a positive sentiment or a negative sentiment, where each classification constitutes a task 430 about a collection 410. A label 445 refers to a specific prediction about a specific classification. For example, a label 445 may be the "positive sentiment" of a human communication, or the "negative sentiment" of a human communication. In some cases, labels 445 can be applied to merely portions of documents 435, such as paragraphs in an article or particular names or places mentioned in a document 435. For example, a label 445 may be a "positive opinion" expressed about a product mentioned in a human communication, or a "negative opinion" expressed about a product mentioned in a human communication. In some example embodiments, a task may be a sub-task of another task, allowing for a hierarchy or complex network of tasks. For example, if a task has a label of "positive opinion," there might be sub-tasks for types of "positives opinions," like "intention to purchase the product," "positive review," "recommendation to friend," and so on, and there may be subtasks that capture other relevant information, such as "positive features."

Annotations 440 refer to classifications imputed onto a collection 410 or a document 435, often times by human input but may also be added by programmatic means, such as interpolating from available metadata (e.g., customer value, geographic location, etc.), generated by a pre-existing natural language model, or generated by a topic modeling process. As an example, an annotation 440 applies a label 445 manually to a document 435. In other cases, annotations 440 are provided by users 235 from pre-existing data. In other cases, annotations 440 may be derived from human critiques of one or more documents 435, where the computer determines what annotation 440 should be placed on a document 435 (or collection 410) based on the human critique. In other cases, with enough data in a language model, annotations 440 of a collection 410 can be derived from one or more patterns of pre-existing annotations found in the collection 410 or a similar collection 410.

In some example embodiments, features 450 refer to a library or collection of certain key words or groups of words that may be used to determine whether a task 430 should be associated with a collection 410 or document 435. Thus, each task 430 has associated with it one or more features 450 that help define the task 430. In some example embodiments, features 450 can also include a length of words or other linguistic descriptions about the language structure of a document 435, in order to define the task 430. For example, classifying a document 435 as being a legal document may be based on determining if the document 435 contains a threshold number of words with particularly long lengths, words belonging to a pre-defined dictionary of legal-terms, or words that are related through syntactic structures and semantic relationships. In some example embodiments, features 450 are defined by code, while in other cases features 450 are discovered by statistical methods. In some example embodiments, features 450 are treated independently, while in other cases features 450 are networked combinations of simpler features that are used in combination utilizing techniques like "deep-learning." In some example embodiments, combinations of the methods described herein may be used to define the features 450, and embodiments are not so limited. One or more processors may be used to identify in a document 435 the words found in features data structure 450 to determine what task should be associated with the document 435.

In some example embodiments, a work unit's data structure 455 specifies when humans should be tasked to further examine a document 425. Thus, human annotations may be applied to a document 435 after one or more work units 455 is applied to the document 435. The work units 455 may specify how many human annotators should examine the document 435 and in what order of documents should document 435 be examined. In some example embodiments, work units 455 may also determine what annotations should be reviewed in a particular document 435 and what the optimal user interface should be for review.

In some example embodiments, the data structures 405, 415, 420 and 425 represent data groupings related to user authentication and user access to data in system architecture. For example, the subscribers block 405 may represent users and associated identification information about the users. The subscribers 405 may have associated API keys 415, which may represent one or more authentication data structures used to authenticate subscribers and provide access to the collections 410. Groups 420 may represent a grouping of subscribers based on one or more common traits, such as subscribers 405 belonging to the same company. Individual users 425 capable of accessing the collections 410 may also result from one or more groups 420. In addition, in some cases, each group 420, user 425, or subscriber 405 may have associated with it a more personalized or customized set of collections 510, documents 435, annotations 440, tasks, 430, features 450, and labels 445, based on the specific needs of the customer.

Below, details of the tokenizer and tagger according to embodiments of the present disclosure are described under several subheadings.

Figure 5:
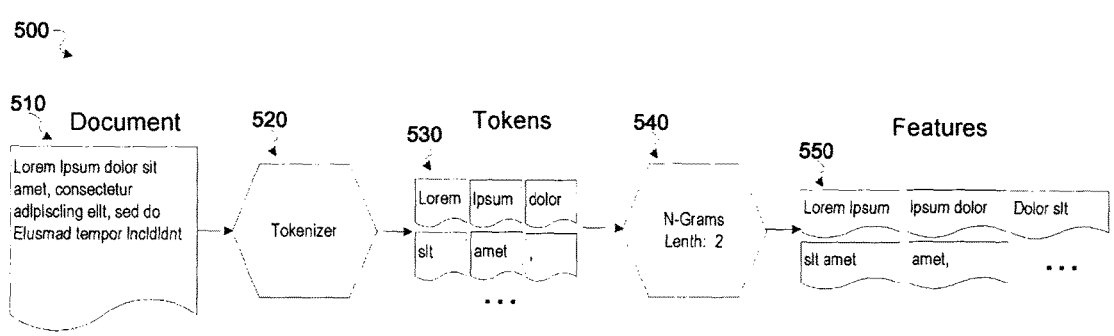
FIG. 5 is flowchart showing an example methodology for processing the human communications in a document into tokens, then into an array of features using an example feature type, according to some embodiments.

I. General Description of Tokenization According to Embodiments of the Present Disclosure Referring to FIG. 5, flowchart 500 shows an example methodology for processing the human communications in a document into tokens, then into an array of features using an example feature type, according to some embodiments. The flowchart 500 provides simply one example for the general concept of tokenization and feature extraction, an example type of inputs, and an example type of outputs. This example may be generalized to utilize other feature types based on the rationale provided herein, and embodiments are not so limited.

The example process starts with step 510, beginning with containing text representing human communications. Step 510 may be generalized to include a subset of the document, referred to as a span, or multiple documents. In general, the process begins with a set of text with an arbitrary length. The text may be written in any language, and in some embodiments, the text may include more than one language. The architecture of the present disclosure is configured to process text of the documents regardless of what language or how many languages are included.

At step 520, the text of the document may be partitioned into a plurality of tokens, which are strings organized in a consistent manner (e.g., the document is subdivided into an array of tokens, such as single words or parts thereof, spaces, punctuation, substrings of words that have meaningful internal boundaries, and groups of words, in the order they appear) by a tokenizer program or engine. The tokenizer may be configured to handle any number of languages, or handle the case where the document is written in multiple languages. In some embodiments, the tokenizer outputs a number of tokens that is organized in a common format, regardless of the type of language or number of languages. An example array of the tokens is shown in step 530, which is based on the example filler language illustrated in the document at step 510.

At step 540, the feature extraction architecture according to aspects of the present disclosure takes as input for a feature type the array of tokens in step 530, processed by the tokenizer at step 520, according to some embodiments. As previously mentioned, since the array of tokens may be outputted by the tokenizer into a common format, regardless of the language, the feature type used at step 540 may reliably accept as input any array of tokens processed by the tokenizer, due to the common format. In this example, a feature type called "N-Grams" is selected to convert the array of tokens in step 530 into an array of features at step 550. In this case, the N-Grams feature type takes as an input in array of tokens, which may include punctuation, and outputs an array of pairwise tokens, i.e., the first and second token are combined into a first feature in the array of features, the second and third token combined into a second feature, the third and fourth token are combined into a third feature, and so on, as shown. Thus, the array of features at step 550 represents one example of a more sophisticated permutation of the tokens comprising the original document. A natural language model may be trained on this array of features, along with many other different types of arrays of features. In general, many other types of feature types may be used to process the array of tokens at step 530 into a different set of features at step 550. Feature extraction is described in more detail in U.S. patent application Ser. No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION," which is again incorporated by reference in its entirety.

Figure 6:
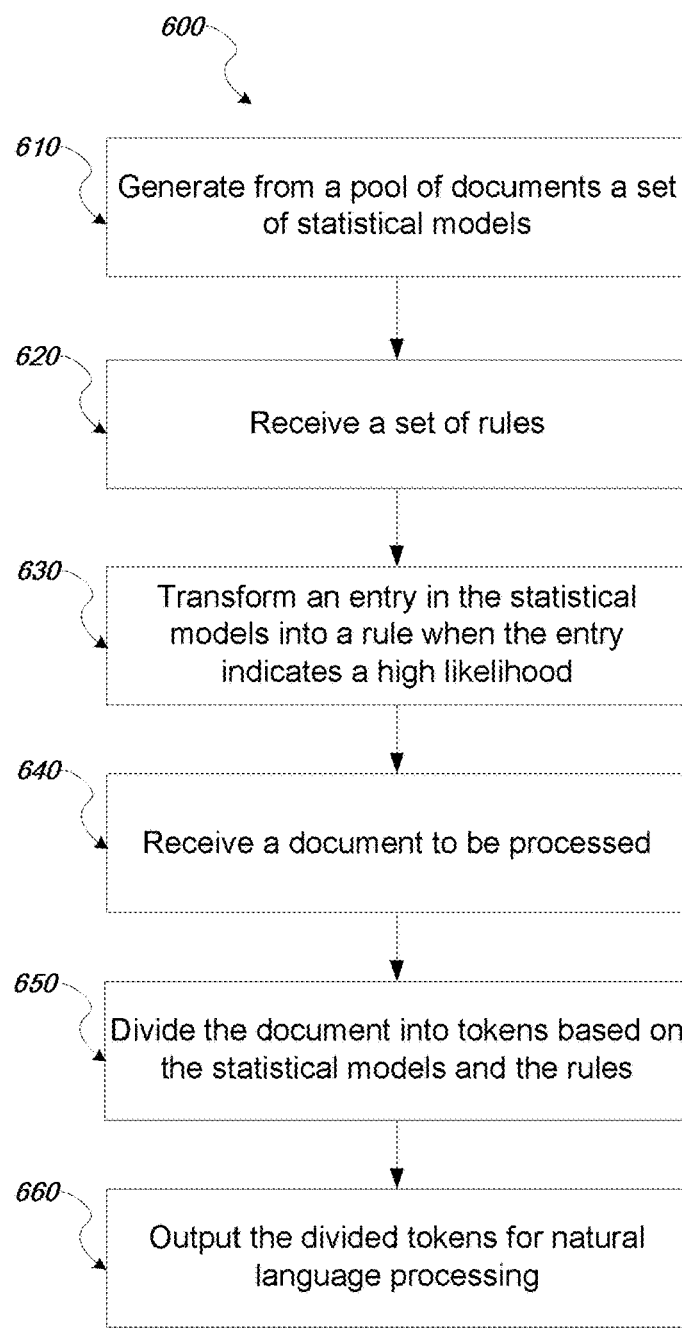
FIG. 6 is flowchart showing an example tokenization process according to some embodiments.

Referring to FIG. 6, flowchart 600 shows an example tokenization process according to some embodiments. Various steps in the example tokenization process may be performed by one or more processors in a natural language processing platform.

At step 610, the process begins by generating from a pool of documents a set of statistical models. The pool of documents may comprise documents similar to the document to be processed. For example, if the document to be processed is in Japanese, the pool of documents may comprise a number of Japanese documents. If the document to be processed is a tweet, the pool of documents may comprise a number of tweets. If the document to be processed is about the insurance industry, the pool of documents may comprise a number of documents about the insurance industry. Statistical models are described in more detail in Subsection III below.

At step 620, the process continues by receiving a set of rules. Rules are described in more detail in Subsection II below.

At step 630, the process continues by transforming one or more entries in the statistical models into new rules that are added to set of rules when the entries indicate a high likelihood. In other words, the tokenizer and tagger might use machine intelligence to re-write its own code-base. For example, a machine learning process (statistical models) might predict with high confidence that the word 'globe' is a noun in certain contexts, and the tokenizer and tagger evaluate that it will be faster to process this decision as part of the code-base (rules) rather than consulting a machine learning service (statistical models). In this case, the tokenizer and tagger can modify its own code-base to include additional functions to explicitly process the word 'globe' in certain contexts. As another example, newly developed slangs may be added to existing dictionary type of rules.

In some embodiments, the tokenizer and tagger might rewrite its own code-base so that all the processing can be performed by hard-coded rules rather than machine learning for direct processing of the byte-stream of information. The manner in which the code-base can be rewritten can be optimized for speed, minimizing the passes that the tokenizer and tagger need to make over the data, and allowing everything to be expressed in coded rules for transparency and easy auditing.

At step 640, the process continues by receiving a document to be processed. A document represents a human communication expressed in a single discrete package, such as a single tweet, a webpage, a chapter of a book, a command to a device, or a journal article. The document may comprise characters (in the case of CJK languages), letters (in the case of western languages such as English), spaces (usually in English but not in CJK), punctuations, numbers, other symbols, etc.

At step 650, the process continues by dividing the document to be processed into tokens based on the set of statistical models and the set of rules, wherein the statistical models are applied where the rules fail to unambiguously tokenize the document. More details are described in Subsections II and III below.

At step 660, the process concludes by outputting the divided tokens for natural language processing. The tokens may be outputted to feature extraction functionality, where one or more tokens may form a feature used in natural language processing. Reference may be made to steps 520 and 530 in FIG. 5.

Figure 7:
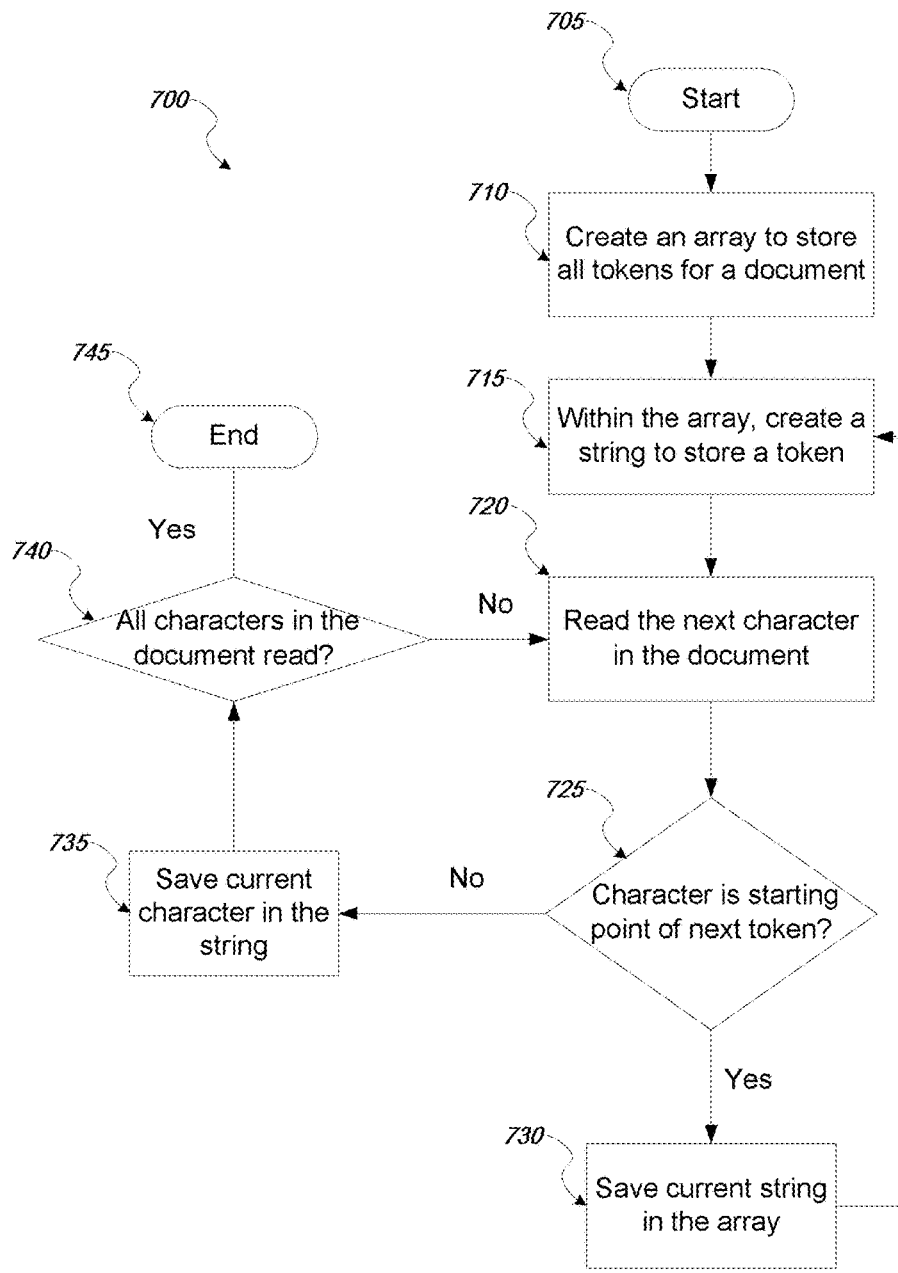
FIG. 7 is a flowchart showing an example algorithm for dividing a document into tokens, according to some embodiments.

Referring to FIG. 7, flowchart 700 shows an example algorithm for dividing a document into tokens, according to some embodiments. At step 710, the example algorithm begins by creating an array to store all tokens for a document. At step 715, the example algorithm continues by creating a string to store a token within the array. At step 720, the example algorithm continues by reading the next character (or letter, space, punctuation, number, symbol, etc.) in the document. At step 725, the example algorithm continues by determining whether the character is the starting point of the next token. The determination at step 725 is based on rules and/or statistical models. If so, the example algorithm continues to step 730. Otherwise, the example algorithm continues to step 735. At step 730, the example algorithm continues by saving the current string in the array and returning to step 715. At step 735, the example algorithm continues by saving the current character in the string and continuing to step 740. At step 740, the example algorithm continues by determining whether all characters in the document have already been read. If so, the example algorithm ends at step 745. Otherwise, the example algorithm returns to step 720.

II. Details of Rule-Based Tokenization

A rule is a decision criterion in the performance of tokenization. In the example algorithm described with reference to FIG. 7, a rule may help make the determination in step 725 whether a character is the starting point of the next token (boundary determination). A rule may be in the form of code embedded in the software of natural language processing.

An example type of rules may be referred to as a "glossary," "dictionary," or "lexicon." These rules may identify a number of character/letter sequences as valid tokens. For example, these rules may be generated based on an existing dictionary, each character/letter sequence being a term in the dictionary. Thus, when one of these character/letter sequence appears in a document, it may be outputted as a token without the involvement of statistical models.

Another example type of rules involves handling of spaces, punctuations, capitalization, etc. These rules are especially useful in the processing of languages such as English. For example, a stopping point of a token may be identified when the current character is a space, and the previous character was not a space. As another example, a stopping point of a token may be identified when the current character is a comma, and the previous character was a letter. As yet another example, a stopping point of a token may be identified when the current character is a capital letter, and the previous character was a space.

Another example type of rules involves handling of numbers. For example, a stopping point of a token may be identified when the current character is a digit, and the previous character was not a digit. As another example, a token does not reach the stopping point when a comma is located between two digits.

Another example type of rules involves handling of multiple languages. These rules may recognize instances in a document where one language transitions to another language, and uses a different set of rules and statistical models for the new language. In other words, a rule may divide portions of the document in different languages into different segments, and the segments of the document in different languages are divided into tokens based on a different combination of rules and statistical models. For example, the Chinese segments may be tokenized based on statistical models, while the English segments may be tokenized based on rules.

Another example type of rules may trigger the application of rules and/or statistical models for further tokenization. For example, a rule may trigger the application of statistical models or trigger the "dictionary" type of rules whenever a letter is detected after "#," to better process hashtags which may comprise words with no spaces in between, such as "#GoodWork."

III. Details of Statistics-Based Tokenization

Statistical models can be particularly useful when processing CJK languages or hashtags which do not have spaces between words. Furthermore, statistical models can be useful when rules alone cannot capture all the ambiguities in the communications, especially when languages are evolving, or when communications in a particular area adopt special expressions.

An example type of statistical models may comprise one or more entries each indicating a likelihood of appearance (word frequency) of a character/letter sequence in the pool of documents. An example is shown in the table below for Japanese language:

| | |
|---|---|
| 59.60 | クラス |
| 59.59 | 犯罪 |
| 59.56 | 午前 |
| 59.48 | 会長 |

In the table, for example, in every 1,000,000 documents in the document pool, the character sequence "クラス" appears for approximately 60 times. Character/letter sequences with higher word frequencies are more likely to be identified as tokens.

Taking CJK languages as an example, dividing the document to be processed into tokens based on the set of statistical models may comprise generating all possible 2-character and 3-character sequences in a document (similar to feature extraction described in U.S. patent application Ser. No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION," which is again incorporated by reference in its entirety), look for these sequences in the statistical models, and calculate the most likely stopping points of tokens.

In some embodiments, dividing the document to be processed into tokens based on the set of statistical models may comprise comparing the statistical likelihood of more than one candidate set of tokens. For example, a Chinese language segment "明天下午" may be possibly tokenized into "明天"+"下午", or "明"+"天下"+"午". The first candidate set may be preferred, because "明天" and "下午" have higher word frequencies than "天下".

In some embodiments, the candidate set of tokens that contains tokens with smallest sizes may be preferred. In other words, the tokenizer may be configured to handle ambiguous tokens by erring on the side of over tokenization. That is, multiple letters or characters may be partitioned into two or more tokens if it is ambiguous to the tokenizer that the combination of the multiple letters or characters forms a single word or not. In later steps involving training a natural language model, this handling of ambiguous tokens allows a reviewer or an annotator the opportunity to combine the two or more tokens together to form the single word.

In some embodiments, more than one candidate set of tokens may be outputted for natural language processing. In other words, the tokenizer and tagger might produce multiple candidate sets of tokens, and offer the multiple streams in parallel for downstream processes. For example, different versions of a sentiment classification model could be trained in parallel on different token streams, and the model that performs best on test data could be selected for use.

In some embodiments, the statistical models may be generated based at least in part on human annotations. For example, the tokenizer and tagger may generate one or more human readable prompts configured to elicit annotations of one or more documents in the pool of documents, wherein the annotations comprise identification of one or more character/letter sequences in the documents as valid tokens; and receive one or more annotations elicited by the human readable prompts. The human readable prompts may be, for example, in the form of a graphic user interface ("GUI"). The human readable prompts may be generated locally or remotely. The documents may be annotated by one annotator or multiple annotators. In the case of multiple annotators, annotation aggregation algorithms (see U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING,") which is again incorporated by reference in its entirety) may be useful in processing different annotations into information most useful to the machine learning process.

Figure 8:
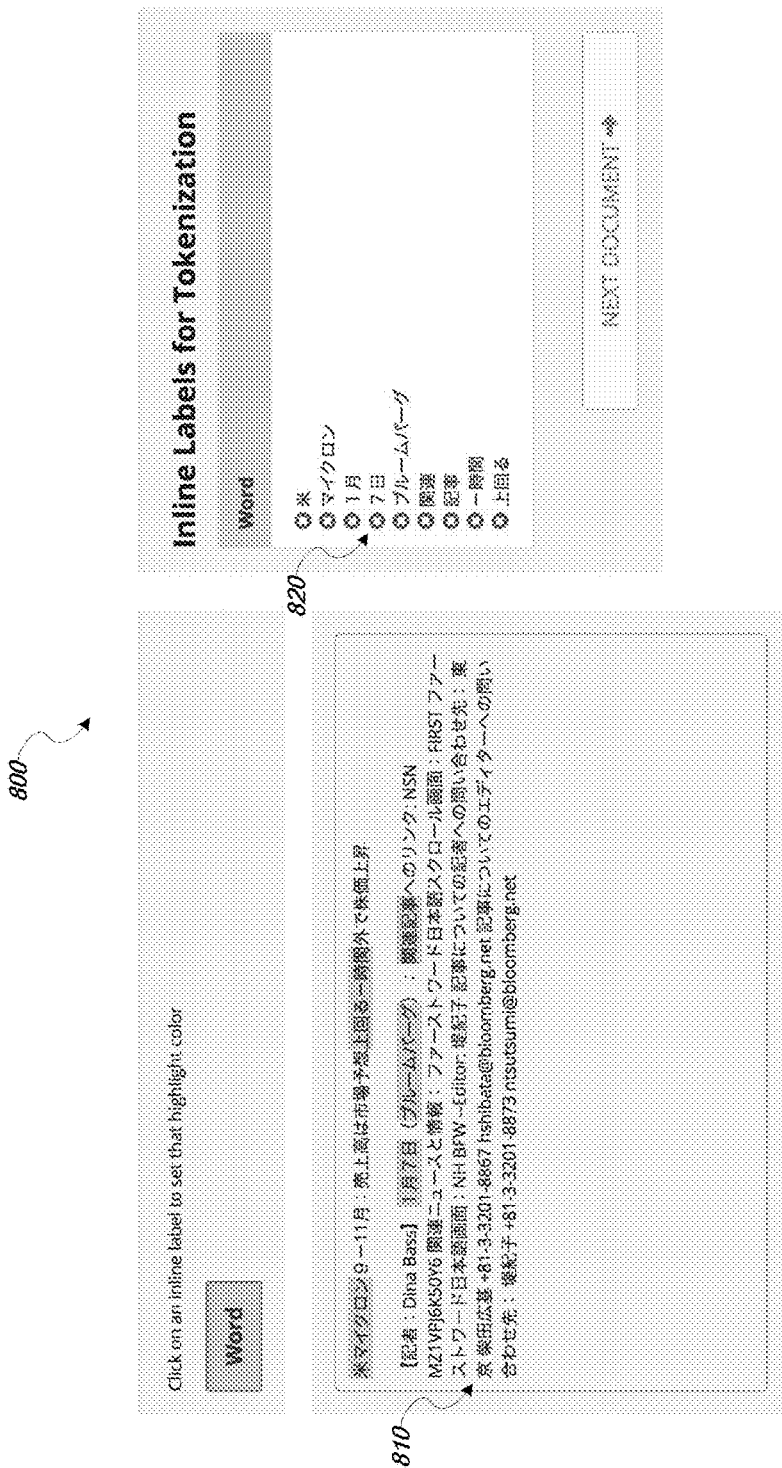
FIG. 8 is a diagram showing an example user interface to elicit annotations of a document, according to some embodiments.

Referring to FIG. 8, diagram 800 shows an example user interface to elicit annotations of a document, according to some embodiments. As shown in the example user interface, a document 810 is presented to a human annotator. The human annotator identifies a number of character sequences 820 as valid tokens by highlighting the character sequences 820 in the document 810.

Typically, the human annotator would be capable of comprehending the text in document 810 in the language as shown. Here, the text in document 810 is in mostly Japanese. For reference, the text in document 810 reads:

"US Micron September to November: Sales will exceed market expectations—time outside in the stock price rise" in the title, and "[Reporter: Dina Bass] January 7 (Bloomberg): Links to related articles: NSN MZ1VPJ6K50Y6 Related news and information: First word Japanese scroll screen: FIRST First word Japanese screen: NH BFW—Editor: Noriko Tsutsumi To contact the reporter on this story: Tokyo Shibata Hiromoto +81-3-3201-8867 hshibata@bloomberg.net To contact the editor responsible for this story Noriko Tsutsumi +81-3-3201-8873nsutsumi@bloomberg.net" in the body of the text.

For reference, the text in the annotation options 820 reads in order from top to bottom:

"US

Micron

January

7th

Bloomberg

Related

Article

—time more than"

After annotations are received, the tokenizer may generate statistical models based on the received annotations, wherein the statistical models comprise one or more entries each indicating a likelihood of appearance of a character/letter sequence in the character/letter sequences annotated as valid tokens. For example, in Japanese language processing, if a total of 1,000,000 tokens are annotated, and 60 of these annotated tokens are a particular character sequence, e.g., "犯罪", the statistical probability for "犯罪" is 0.006%.

In some embodiments, the statistics based on annotations and the statistics based on word frequencies may be combined using, for example, a weighted average approach.

In some embodiments, the rules may be in the form of probabilistic rules. Tokenization may be performed based on a weighted average of the probabilistic rules and the statistical models.

IV. Language Agnostic Tokenization

In some embodiments, the document to be processed may be in one or more languages, and the divided tokens are outputted in a language agnostic format.

Figure 9:
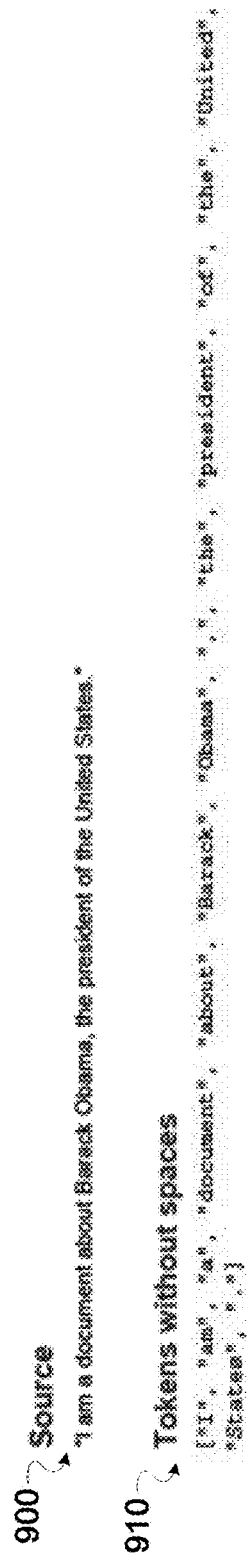
FIG. 9 shows an example sentence to demonstrate how the tokenizer according to the present disclosures may partition a sentence into a plurality of tokens.

Referring to FIG. 9, an example sentence 900 is shown to demonstrate how the tokenizer according to the present disclosures may partition a sentence into a plurality of tokens. Here, the example sentence 900 states, "I am a document about Barack Obama, the president of the United States." In this example, the tokenizer according to the present disclosures may partition the sentence 900 into a number of tokens as shown in the set 910. In this case, each word represents a single token, and each punctuation mark separately represents a single token. Notice that some of the tokens may be comprised of just a single character, such as a comma or the letter "I," while in other cases, some tokens are comprised of multiple characters, e.g., the token "document," or "Obama."

Referring to FIG. 10, the chart 1000 shows a more detailed example of a format for tokenizing the sentence 1000 into an annotated set, according to some embodiments. The columns 1005, 1010, and 1015, show what an annotated set of the first 56 characters of sentence 900 may look like when processed by the tokenizer according to some embodiments. For example, at the top of column 1005, the first token comprised of the text "I" is shown. Some annotations for the first token are also included, such as offset, length, and value. The term "offset" means how many characters from the beginning of the sentence (or document) is the present token found, while the term "length" means how many characters is the present token comprised of. The term "value" means what type of token is the present token, such as a word, a space, structural information like a table, semantic information, paragraph and sentence breaks or a punctuation mark (described more detail in Subsection V below). This example format repeats for each of the tokens in order, as shown in columns 1005, then to column 1010, and then to column 1015.

While in this format, other programs in the natural language processing server, such as the network-based system 105, may be configured to process the tokens in any number of ways. This example common format may allow any and all languages to be processed by the same tokenizer, and thereafter processed by the same programs for natural language processing, regardless of the language. In addition, this example common format may also allow for multiple languages to be stored in the same set of tokens.

As an example of Japanese language tokenization, in the sentence "ドレスは9000円です" (meaning "the dress is 9000 yen"), a rule for processing Japanese (hiragana and katakana) text identifies the initial segment "ドレスは", which is statistically tokenized into two tokens "ドレス" and "は". A rule for numbers then identifies the token "9000". Finally, a second rule for Japanese (kanji and hiragana) identifies the final segment "円です", which is statistically tokenized into two tokens "円" and "です". Five tokens are identified: "ドレス", "は", "9000", "円" and "です".

The result of tokenization may be outputted as follows:

```
{
  {
    "offset": 0,
    "length": 3,
    "value": "word",
    "text": "ドレス"
  }
  {
    "offset": 3,
    "length": 1,
    "value": "word",
    "text": "は"
  },
  {
    "offset": 4,
    "length": 4,
    "value": "number",
    "text": "9000"
  },
  {
    "offset": 8,
    "length": 1,
    "value": "word",
    "text": "円"
  },
  {
    "offset": 9,
    "length": 2,
    "value": "word",
    "text": "です"
  }
}
```

Therefore, in the example above for Japanese and in the example in FIG. 10 for English, the results of tokenization are in a uniform, and thus language agnostic, format.

V. Normalization of Tokens

In some embodiments, a token might be normalized to a consistent spelling. For example, a misspelled "receipt" might be corrected to "receipt." In other examples, the spelling might be normalized after morphological segmentation (see Section VII below), like "running" segmented to "run" and "ing" or "sizing" segmented to "size" and "ing." In other examples, the tokenizer might expand abbreviations and acronyms to the full words. In all cases, both the original form and the normalized form may be available for later processing.

In some embodiments, normalization may be based on rules and/or statistical models. Therefore, the set of statistical models may further comprise statistical models for normalizing variants of a token into a single token and/or the set of rules may further comprise rules for normalizing variants of a token into a single token; and the tokenization method may further comprise normalizing variants of a token into a single token based on the statistical models and/or the rules.

As an example of rule-based normalization, in some embodiments, a rule may provide that both "part-time" and "part time" should be normalized into "part-time." As an example of statistics-based normalization, if "receipt" appears in a much higher frequency than "receipt," "receipt" may be recognized as the correct spelling.

In some embodiments, the tokenizer might use similar known documents and knowledge bases to provide extra information to normalize the tokens. For example, one document may reveal through the context of the words that appear in that document that there is a direct relationship between an acronym and the sequence of words that it stands for. One example is the appearance of the word "NATO" in the following sentence: "North Atlantic Treaty Organization (NATO) is an intergovernmental military alliance." The relationship between "NATO" and "North Atlantic Treaty Organization" can be learned directly from the document containing this sentence, and this relationship can then be applied by the tokenizer to normalize other documents only containing the word "NATO" in isolation.

VI. Tagging of Tokens

In some embodiments, a token may be tagged with one or more "values," as shown in the example in FIG. 10. For example, the token "IBM" might be tagged with the values "word," "noun," "acronym," and/or "company name." Tags detected by the tokenizer and tagger can be incorporated as features in the feature extraction process as exemplified by step 540 in FIG. 5. These features can be used to improve model performance. For example, knowing that a token is a "noun" is valuable information for a span task that identifies persons and company names.

In some embodiments, tagging may be based on rules and/or statistical models. Therefore, the set of statistical models may further comprise statistical models for adding tags to the tokens and/or the set of rules may further comprise rules for adding tags to the tokens; and the tokenization method may further comprise adding tags to the tokens based on the statistical models and/or the rules.

As an example of rule-based tagging, in some embodiments, a rule may provide that a token ending with "-ly" should be tagged as "adverb" As an example of statistics-based tagging, in some embodiments, "globe" may be tagged as "noun" based on statistical models.

In some embodiments, a token may have tags that are semantic and/or tags that are structural. For example, if the token "$55,000" occurs in the fifth row and third column of a table, the token might be tagged with the semantic value "currency" and also tagged with the structural values {"row":5} and {"column":3}. These values can be consistent whether the table was expressed in any language, or in any format such as HTML tags or PDF document, or any other structural representation, allowing for the same information to be captured identically even though it is presented through different methods in the source text.

In some embodiments, the tokens may be tagged with formatting information such as whether the text was bold or italic. The formatting information may be explicit in the text, like the "<b>" symbol for bold in HTML, or the formatting information might be parsed from style documents like CSS.

VII. Other Aspects of the Present Disclosure

In some embodiments, the tokenizer may divide a document on various levels, so that each token contains a morpheme, a word, or a group of words. A group of words may be a phrase, a sentence, a paragraph, a subsection, a section, or a turn in a conversation. A turn in a conversation comprises all words spoken by one speaker in a conversation until the conversation turns to another speaker. These types of tokens may be outputted in addition to word-level tokens.

As an example of morpheme-level tokenization, the expression "Obama's" may be deconstructed by the tokenizer into two expressions, "Obama" and "'s." As another example, the word "eloquently" may be deconstructed by the tokenizer into two expressions, "eloquent" and "-ly". As another example, the word "smaller" may be deconstructed by the tokenizer into two expressions, "small" and "-er".

In some embodiments, the set of rules may further comprise one or more rules that identify markup language content (such as HTML and XML), an Internet address (such as an URL and an email address), a hashtag, or an emoji/emoticon. In other words, the tokenizer includes a database of regular expressions and character sequences, such that the tokenizer is configured to recognize document markup and other well-known character patterns interleaved between language content. Various rules- and statistics-driven methods may be incorporated using these one or more databases to determine when a part of the text represents an HTML or XML tag (e.g., <p>), a URL or e-mail address, a hashtag (e.g. #GoodWork), emoji, or an emoticon (e.g., ¯\_(ツ)_/¯ ), as some examples for handling these additional expressions.

In some embodiments, the set of statistical models and/or the set of rules are based at least in part on the author the document. In other words, the tokenizer and tagger might adapt to the specific authors of the text so that customized tokenization strategies can be applied. This can be achieved by including rules or statistics that capture a specific author's writing style. For example, one author may write "full time employment" and a different author may write "full-time employment." The tokenizer can be programmed to identify the distinct hyphenation strategies of these two authors and tokenize both example sentences into the same two tokens: "full-time" and "employment."

In some embodiments, the set of statistical models and/or the set of rules are based at least in part on intra-document information. In other words, the tokenizer and tagger might use intra-document information to help make a tokenization decision. For example, if "Obama's" appear, the presence of "Obama" elsewhere in the same document can be evidence that "Obama" and "'s" should become separate tokens.

In some embodiments, the tokenizer might include values that are the output of clustering algorithms or other kinds of machine learning like the Deep Learning "Word2Vec" representation of word vectors. For example, Deep Learning models can be developed to identify similar character sequences such as "xray" and "x-ray" that are equivalent in meaning. These character sequences can then, in turn, be treated by the tokenizer as individual tokens.

In some embodiments, the tokenizer will record relationships among tokens. For example, in the phrase "three big dogs," the token "three" might be recorded as being syntactically dependent on the token "dogs." In another example, the phrase "the food was tasty and the dog ate it," the token "it" might be recorded as an anaphora (reference) to "food." Tokens can also contain values that indicate their relationship to discourse as a whole, such as whether information expressed in a token or series of tokens is "given" (has appeared in prior discourse) or "new" (has not appeared in prior discourse). Other examples of relationship types include: structural elements like the relationships between cells in a table; chains of replies in forums; email metadata, signatures and quoted text; sections and chapters within documents; captions and figures; citations; bibliographies; and relationships between text in instant messaging platforms and any embedded documents. In all cases, the token itself and any other tokens it is related to may be available for later processing.

In some embodiments, the tokenizer may be configured to process a textual output from speech recognition and speech-to-text transcription systems. In some embodiments, the tokenizer may be configured to process a textual output from OCR.

In some embodiments, the tokenizer and tagger may use third-party data and processes to help choose between tokenization and tagging strategies. For example, independent sources of text could be used to train a statistical text classification model that could distinguish between the social media and news genres. Genre-specific tokenizers and taggers could then be applied according to the determined text genre.

An apparatus for tokenizing text for natural language processing may comprise one or more processors configured to perform the process described above.

A non-transitory computer readable medium may comprise instructions that, when executed by a processor, cause the processor to perform the process described above.

Figure 11:
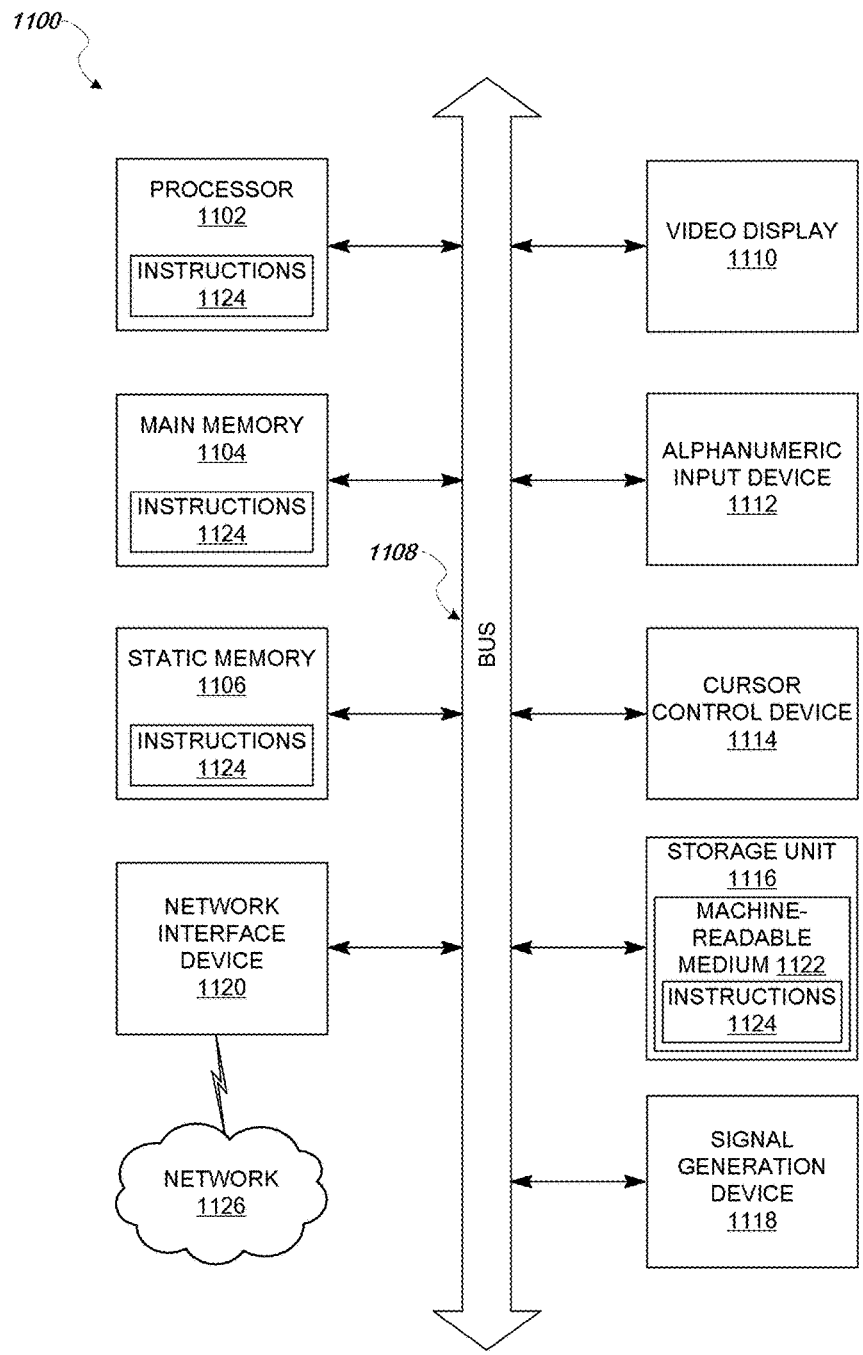
FIG. 11 is a block diagram illustrating components of a machine, according to some example embodiments, able to read instructions from a machine-readable medium and perform any one or more of the methodologies discussed herein.

Referring to FIG. 11, the block diagram illustrates components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine 110 or a client machine in a server-client network environment, or as a peer machine in a distributed (e.g., peer-to-peer) network environment. The machine 1100 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine 1100 is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a video display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein, including, for example, any of the descriptions of FIGS. 1-10. The instructions 1124 may also reside, completely or at least partially, within the main memory 1104, within the processor 1102 (e.g., within the processor's cache memory), or both, before or during execution thereof by the machine 1100. The instructions 1124 may also reside in the static memory 1106.

Accordingly, the main memory 1104 and the processor 1102 may be considered machine-readable media 1122 (e.g., tangible and non-transitory machine-readable media). The instructions 1124 may be transmitted or received over a network 1126 via the network interface device 1120. For example, the network interface device 1120 may communicate the instructions 1124 using any one or more transfer protocols (e.g., HTTP). The machine 1100 may also represent example means for performing any of the functions described herein, including the processes described in FIGS. 1-10.

In some example embodiments, the machine 1100 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1122 able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database 115, or associated caches and servers) able to store instructions 1124. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device 130 or 150, as well as cloud-based storage systems or storage networks that include multiple storage apparatus or devices 130 or 150. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1122 is non-transitory in that it does not embody a propagating signal. However, labeling the tangible machine-readable medium 1122 as "non-transitory" should not be construed to mean that the medium is incapable of movement; the medium should be considered as being transportable from one physical location to another. Additionally, since the machine-readable medium 1122 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1122 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1102 or a group of processors 1102) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1102 or other programmable processor 1102. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1108) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions described herein. As used herein, "processor-implemented module" refers to a hardware module implemented using one or more processors 1102.

Similarly, the methods described herein may be at least partially processor-implemented, a processor 1102 being an example of hardware. For example, at least some of the operations of a method may be performed by one or more processors 1102 or processor-implemented modules. As used herein, "processor-implemented module" refers to a hardware module in which the hardware includes one or more processors 1102. Moreover, the one or more processors 1102 may also operate to support performance of the relevant operations in a "cloud computing" environment or as a "software as a service" (SaaS). For example, at least some of the operations may be performed by a group of computers (as examples of machines 1100 including processors 1102), with these operations being accessible via a network 1126 (e.g., the Internet) and via one or more appropriate interfaces (e.g., an API).

The performance of certain operations may be distributed among the one or more processors 1102, not only residing within a single machine 1100, but deployed across a number of machines 1100. In some example embodiments, the one or more processors 1102 or processor-implemented modules may be located in a single geographic location (e.g., within a home environment, an office environment, or a server farm). In other example embodiments, the one or more processors 1102 or processor-implemented modules may be distributed across number of geographic locations.

Unless specifically stated otherwise, discussions herein using words such as "processing," "computing," "calculating," "determining," "presenting," "displaying," or the like may refer to actions or processes of a machine 1100 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for tokenizing text for natural language processing, the method comprising:
    generating, by one or more processors in a natural language processing platform, and from a pool of documents, a set of statistical models comprising one or more entries each indicating a likelihood of appearance of a character/letter sequence in the pool of documents;
    receiving, by the one or more processors, a set of rules comprising rules that identify character/letter sequences as valid tokens;
    transforming, by the one or more processors, one or more entries in the statistical models into new rules that are added to the set of rules when the entries indicate a high likelihood;
    receiving, by the one or more processors, a document to be processed;
    dividing, by the one or more processors, the document to be processed into tokens based on the set of statistical models and the set of rules, wherein the statistical models are applied where the rules fail to unambiguously tokenize the document; and
    outputting, by the one or more processors, the divided tokens for natural language processing.

2. The method of claim 1, wherein the set of statistical models further comprises statistical models based on human annotation, and the method further comprises:
    generating, by the one or more processors, one or more human readable prompts configured to elicit annotations of one or more documents in the pool of documents, wherein the annotations comprise identification of one or more character/letter sequences in the documents as valid tokens;
    receiving, by the one or more processors, one or more annotations elicited by the human readable prompts; and
    generating, by the one or more processors, statistical models based on the received annotations, wherein the statistical models comprise one or more entries each indicating a likelihood of appearance of a character/letter sequence in the character/letter sequences annotated as valid tokens.

3. The method of claim 1, wherein:
    the document to be processed is in one or more languages; and
    the divided tokens are outputted in a language agnostic format.

4. The method of claim 3, wherein:
    the document to be processed is in more than one language;
    the set of rules further comprises a rule that divides portions of the document in different languages into different segments; and
    the segments of the document in different languages are divided into tokens based on a different combination of rules and statistical models.

5. The method of claim 1, wherein the set of rules further comprises a rule that triggers the application of rules and/or statistical models for further tokenization.

6. The method of claim 1, wherein at least one of the divided tokens contains a morpheme.

7. The method of claim 1, wherein at least one of the divided tokens contains a group of words.

8. The method of claim 7, wherein at least one of the divided tokens contains a turn in a conversation.

9. The method of claim 1, wherein dividing the document to be processed into tokens based on the set of statistical models comprises comparing statistical likelihood of more than one candidate set of tokens.

10. The method of claim 9, wherein the candidate set of tokens that contains tokens with smallest sizes is preferred.

11. The method of claim 9, wherein more than one candidate set of tokens is outputted for natural language processing.

12. The method of claim 1, wherein:
    the set of statistical models further comprises one or more statistical models for normalizing variants of a token into a single token and/or the set of rules further comprises one or more rules for normalizing variants of a token into a single token; and
    the method further comprises normalizing variants of a token into a single token based on the statistical models and/or the rules.

13. The method of claim 1, wherein:
    the set of statistical models further comprises one or more statistical models for adding tags to the tokens and/or the set of rules further comprises one or more rules for adding tags to the tokens; and
    the method further comprises adding tags to the tokens based on the statistical models and/or the rules.

14. The method of claim 13, wherein the tags are based on semantic information and/or structural information.

15. The method of claim 1, wherein the set of rules further comprises one or more rules that identify markup language content, an Internet address, a hashtag, or an emoji/emoticon.

16. The method of claim 1, wherein the set of statistical models and/or the set of rules are adjusted based at least in part on an author of the document.

17. The method of claim 1, wherein the set of statistical models and/or the set of rules are based at least in part on intra-document information.

18. An apparatus for tokenizing text for natural language processing, the apparatus comprising one or more processors configured to:
    generate from a pool of documents a set of statistical models comprising one or more entries each indicating a likelihood of appearance of a character/letter sequence in the pool of documents;
    receive a set of rules comprising rules that identify character/letter sequences as valid tokens;
    transform one or more entries in the statistical models into new rules that are added to the set of rules when the entries indicate a high likelihood;
    receive a document to be processed;
    divide the document to be processed into tokens based on the set of statistical models and the set of rules, wherein the statistical models are applied where the rules fail to unambiguously tokenize the document; and
    output the divided tokens for natural language processing.

19. The apparatus of claim 18, wherein the set of statistical models further comprises statistical models based on human annotation, and the one or more processors are further configured to:

generate one or more human readable prompts configured to elicit annotations of one or more documents in the pool of documents, wherein the annotations comprise identification of one or more character/letter sequences in the documents as valid tokens;

receive one or more annotations elicited by the human readable prompts; and generate statistical models based on the received annotations, wherein the statistical models comprise one or more entries each indicating a likelihood of appearance of a character/letter sequence in the character/letter sequences annotated as valid tokens.

20. A non-transitory computer readable medium comprising instructions that, when executed by a processor, cause the processor to:

generate from a pool of documents a set of statistical models comprising one or more entries each indicating a likelihood of appearance of a character/letter sequence in the pool of documents;

receive a set of rules comprising rules that identify character/letter sequences as valid tokens;

transform one or more entries in the statistical models into new rules that are added to the set of rules when the entries indicate a high likelihood;

receive a document to be processed;

divide the document to be processed into tokens based on the set of statistical models and the set of rules, wherein the statistical models are applied where the rules fail to unambiguously tokenize the document; and output the divided tokens for natural language processing.

* * * * *

UNITED STATES PATENT AND TRADEMARK OFFICE
CERTIFICATE OF CORRECTION

PATENT NO. : 9,965,458 B2  
APPLICATION NO. : 14/964512  
DATED : May 8, 2018  
INVENTOR(S) : Robert J. Munro et al.

Page 1 of 1

It is certified that error appears in the above-identified patent and that said Letters Patent is hereby corrected as shown below:

On the Title Page

Column 1, remove "(73) Assignee: Sansa AI Inc., San Francisco, CA (US)".

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*